US007112640B2

(12) United States Patent
Funaki et al.

(10) Patent No.: US 7,112,640 B2
(45) Date of Patent: Sep. 26, 2006

(54) FLUOROCOPOLYMER AND ITS APPLICATIONS

(75) Inventors: Atsushi Funaki, Ichihara (JP); Hiroki Kamiya, Ichihara (JP); Shigeru Aida, Ichihara (JP); Toshiyuki Chisaka, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/224,969

(22) Filed: Sep. 14, 2005

(65) Prior Publication Data

US 2006/0093827 A1 May 4, 2006

(30) Foreign Application Priority Data

Oct. 28, 2004 (JP) ............................ 2004-314179
Apr. 19, 2005 (JP) ............................ 2005-121575

(51) Int. Cl.
*C08F 214/28* (2006.01)
*C08F 214/18* (2006.01)
*C08F 222/06* (2006.01)
*C08J 7/04* (2006.01)
*G03C 1/492* (2006.01)

(52) U.S. Cl. ...................... 526/249; 526/247; 526/253; 526/254; 526/255; 526/250; 430/270.1; 430/286.1; 522/156

(58) Field of Classification Search ................ 526/249, 526/250, 253
See application file for complete search history.

(56) References Cited

U.S. PATENT DOCUMENTS 3,445,434 A 5/1969 Stilmar
5,461,130 A 10/1995 Kappler et al.
5,958,648 A * 9/1999 Nishimura et al. ...... 430/270.1
6,107,423 A * 8/2000 Wheland et al. ............ 526/249
6,656,553 B1 12/2003 Nishi et al.
6,703,465 B1 3/2004 Funaki et al.
6,753,393 B1 6/2004 Funaki et al.
6,855,787 B1 2/2005 Funaki et al.
2002/0119319 A1 8/2002 Funaki et al.
2004/0001956 A1 1/2004 Funaki et al.
2004/0115606 A1 6/2004 Sumi et al.
2004/0116606 A1 6/2004 Sumi et al.
2004/0142134 A1 7/2004 Funaki et al.
2005/0118368 A1 6/2005 Funaki et al.

FOREIGN PATENT DOCUMENTS

EP 1 375 539 1/2004
GB 1087999 10/1967
JP 11-193312 7/1999
JP 2003 238627 8/2003
JP 2004 075848 3/2004
JP 2004-277689 10/2004

OTHER PUBLICATIONS

U.S. Appl. No. 11/391,311, filed Mar. 29, 2006, Funaki et al.
U.S. Appl. No. 11/224,969, filed Sep. 14, 2005, Funaki et al.

* cited by examiner

*Primary Examiner*—David W. Wu
*Assistant Examiner*—Ives Wu
(74) *Attorney, Agent, or Firm*—Oblon, Spivak, McClelland, Maier & Neustadt, P.C.

(57) ABSTRACT

A fluorocopolymer which comprises repeating units (a) based on tetrafluoroethylene and/or chlorotrifluoroethylene, repeating units (b) based on a cyclic hydrocarbon monomer having a dicarboxylic anhydride group and an endocyclic polymerizable unsaturated group, and repeating units (c) based on other monomer, wherein the repeating units (a) are from 50 to 99.89 mol %, the repeating units (b) are from 0.01 to 5 mol % and the repeating units (c) are from 0.1 to 49.99 mol %, based on the total molar amount of the repeating units (a), (b) and (c), and which has a volume flow rate of from 0.1 to 1,000 $mm^3$/sec., and a laminate and coated product thereof. The fluorocopolymer is excellent in adhesion, heat resistance, weather resistance, stress cracking resistance and fuel barrier properties. The laminate is excellent in interlaminar bonding and fuel barrier properties. The coated product is excellent in heat resistance, chemical resistance, corrosion resistance, oil resistance, weather resistance, abrasion resistance and lubricating properties.

20 Claims, No Drawings

FLUOROCOPOLYMER AND ITS APPLICATIONS

The present invention relates to a fluorocopolymer and its applications.

Fluoropolymers such as a polytetrafluoroethylene, a tetrafluoroethylene/perfluoro(alkyl vinyl ether) copolymer and an ethylene/tetrafluoroethylene copolymer, are used in various fields such as semiconductor industry and automobile industry.

Fluoropolymers are excellent in heat resistance, chemical resistance, weather resistance, gas barrier properties, etc., but their adhesion to other materials is inadequate. For example, in order to let them bond to synthetic resins, metals, metal oxides, glass, ceramics, etc., it is common to employ, for example, a method wherein the surface of fluoropolymers is subjected to corona discharge treatment or sodium etching treatment, and then an adhesive is applied for bonding. Such a bonding method has drawbacks such that the process is cumbersome, and the productivity is low, and it is desired to develop a fluoropolymer which can be bonded to other materials by a simpler method.

As a method for forming a coating film of a fluoropolymer on the surface of a metal substrate, a method may, for example, be mentioned wherein unevenness is preliminarily formed on the surface of the metal substrate by e.g. sand blasting, then a primer is applied, and then particles of a fluoropolymer are deposited thereon and then the fluoropolymer is melted at a temperature of at least the melting point of the fluoropolymer. Also in such a case, it is desired to develop a fluoropolymer excellent in adhesion to the metal substrate, etc., without requiring a primer, with a view to reduction of the cost and improvement of the productivity.

In recent years, a laminate of a fluoropolymer and a polyamide, has been studied as a material for e.g. fuel hoses or fuel tanks for automobiles. In such an application, a layer of a fluoropolymer is required to be bonded firmly to a layer of a polyamide. The bonding method may, for example, be one wherein an adhesive is applied, as the case requires, to a tube of a fluoropolymer having various adhesive functional groups introduced to the surface by surface treatment by a method such as chemical treatment, corona discharge treatment or plasma discharge treatment, and then, on the exterior of the fluoropolymer tube, a polyamide is extruded and laminated. However, such a bonding method has drawbacks such that the process is cumbersome, and the productivity is low. Accordingly, it is desired to develop a fluoropolymer, whereby a laminate can be formed by a simple method such as co-extrusion, without requiring the surface treatment of the layer of the fluoropolymer.

As such a fluoropolymer, JP-A-11-193312 discloses a fluorocopolymer containing repeating units based on maleic anhydride. Such a fluorocopolymer is excellent in adhesion to other materials, but copolymerizability of maleic anhydride with a fluoromonomer is not sufficient. Accordingly, in the production of the fluorocopolymer, it was necessary to employ a special polymerization method. By such a polymerization method, it was not necessarily possible to obtain a fluorocopolymer suitable for various applications.

In Examples of U.K. Patent No. 1087999, a fluorocopolymer is disclosed which contains repeating units based on tetrafluoroethylene/repeating units based on isobutylene/repeating units based on vinyl benzoate/repeating units based on itaconic acid. Such a fluorocopolymer was excellent in adhesion to metals, but its softening temperature was low at 100° C., and the heat resistance was inadequate.

U.S. Pat. No. 3,445,434 discloses an ethylene/tetrafluoroethylene copolymer containing repeating units based on tetrafluoroethylene/repeating units based on ethylene/repeating units based on itaconic acid. However, such an ethylene/tetrafluoroethylene copolymer was inadequate in heat resistance and mechanical strength such as stress cracking resistance.

JP-A-2004-277689 discloses a copolymer containing repeating units based on tetrafluoroethylene/repeating units based on a fluoromonomer/repeating units based on itaconic anhydride. However, by such a combination of monomers, copolymerizability was sometimes inadequate.

It is an object of the present invention to provide a fluorocopolymer which has been desired to be developed under the above-described circumstances, and which is excellent in heat resistance, chemical resistance, weather resistance and fuel barrier properties and also excellent in adhesion to thermoplastic resins or various substrates.

The present invention provides a fluorocopolymer which comprises repeating units (a) based on tetrafluoroethylene and/or chlorotrifluoroethylene, repeating units (b) based on a cyclic hydrocarbon monomer having a dicarboxylic anhydride group and an endocyclic polymerizable unsaturated group, and repeating units (c) based on other monomer (excluding tetrafluoroethylene, chlorotrifluoroethylene and the cyclic hydrocarbon monomer), wherein the repeating units (a) are from 50 to 99.89 mol %, the repeating units (b) are from 0.01 to 5 mol % and the repeating units (c) are from 0.1 to 49.99 mol %, based on the total molar amount of the repeating units (a), (b) and (c), and which has a volume flow rate of from 0.1 to 1,000 $mm^3$/sec.

Further, the present invention provides a laminate comprising a layer of such a fluorocopolymer and a layer of a thermoplastic resin other than the fluorocopolymer, directly laminated to each other, and a coated product comprising a substrate having its surface coated with the fluorocopolymer.

The fluorocopolymer of the present invention is excellent in adhesion to e.g. resins, metals, metal oxides, glass and ceramics and excellent also in heat resistance, chemical resistance, weather resistance and fuel barrier properties.

Further, the fluorocopolymer of the present invention is excellent in co-extrudability with a thermoplastic resin other than the fluorocopolymer. The laminate having the obtained fluorocopolymer and such a thermoplastic resin directly laminated, is excellent in interlaminar bonding properties and fuel barrier properties.

The fluorocopolymer of the present invention is excellent in adhesion to a substrate of e.g. metal, glass, ceramics or a resin and is capable of presenting a coated product having a coating film of the fluorocopolymer on its surface, without using a primer. Such a coated product will be excellent in e.g. heat resistance, chemical resistance, corrosion resistance, oil resistance, weather resistance, abrasion resistance and lubricating properties.

The fluorocopolymer of the present invention comprises repeating units (a) based on tetrafluoroethylene (hereinafter referred to as TFE) and/or chlorotrifluoroethylene (hereinafter referred to as CTFE), repeating units (b) based on a cyclic hydrocarbon monomer having a dicarboxylic anhydride group and an endocyclic polymerizable unsaturated group, and a repeating units (c) based on other monomer (excluding TFE, CTFE and the cyclic hydrocarbon monomer).

In the fluorocopolymer of the present invention, the repeating units (a) are from 50 to 99.89 mol %, the repeating units (b) are from 0.01 to 5 mol %, and the repeating units (c) are from 0.1 to 49.99 mol %, based on the total molar amount of the repeating units (a), (b) and (c). Preferably, the repeating units (a) are from 50 to 99.47 mol %, the repeating units (b) are from 0.03 to 3 mol %, and the repeating units (c) are from 0.5 to 49.97 mol %, and more preferably, the repeating units (a) are from 50 to 98.95 mol %, the repeating units (b) are from 0.05 to 2 mol %, and the repeating units (c) are from 1 to 49.95 mol %. When the repeating units (a), (b) and (c) are within such ranges of mol %, the fluorocopolymer is excellent in heat resistance and chemical resistance. Further, when the mol % of the repeating units (b) is within such a range, the fluorocopolymer is excellent in adhesion to a thermoplastic resin other than the fluorocopolymer, or to a substrate. When the mol % of the repeating units (c) is within such a range, the fluorocopolymer is excellent in moldability and excellent also in mechanical properties such as stress cracking resistance.

In the present invention, "the cyclic hydrocarbon monomer having a dicarboxylic anhydride group and an endocyclic polymerizable unsaturated group" (hereinafter referred to simply as a cyclic hydrocarbon monomer) is a polymerizable compound which is a cyclic hydrocarbon consisting of at least one 5-membered ring or one 6-membered ring and which has a dicarboxylic anhydride group and an endocyclic polymerizable unsaturated group. As the cyclic hydrocarbon, a cyclic hydrocarbon having at least one bridged polycyclic hydrocarbon is preferred. Namely, preferred is a cyclic hydrocarbon having such a bridged polycyclic hydrocarbon, a cyclic hydrocarbon having at least two bridged polycyclic hydrocarbons condensed, or a cyclic hydrocarbon having a bridged polycyclic hydrocarbon condensed with another cyclic hydrocarbon. Further, this cyclic hydrocarbon monomer has at least one endocyclic polymerizable unsaturated group, i.e. at least one polymerizable unsaturated group present among carbon atoms constituting the hydrocarbon ring. This cyclic hydrocarbon monomer further has a dicarboxylic anhydride group (—CO—O—CO—), and the dicarboxylic anhydride group may be bonded to two carbon atoms constituting the hydrocarbon ring or may be bonded to two carbon atoms outside the ring. Preferably, the dicarboxylic anhydride group is bonded to two carbon atoms which are carbon atoms constituting the ring of the above cyclic hydrocarbon and which are adjacent to each other. Further, to the carbon atoms constituting the ring of the cyclic hydrocarbon, instead of hydrogen atoms, halogen atoms, alkyl groups, halogenated alkyl groups or other substituents may be bonded.

As its specific examples, those represented by the formulae (1) to (8) are preferred. Here, in the formulae (2), (5) to (8), R is a $C_{1-6}$ lower alkyl group, a halogen atom selected from a fluorine atom, a chlorine atom, a bromine atom and an iodine atom, or a halogenated alkyl group having hydrogen atoms in the above lower alkyl group substituted by halogen atoms.

Formula (1)

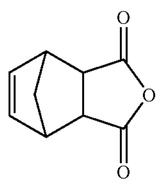

-continued

Formula (2)

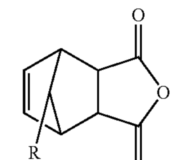

Formula (3)

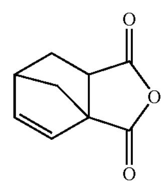

Formula (4)

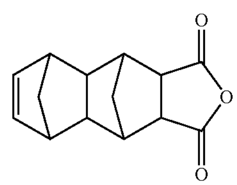

Formula (5)

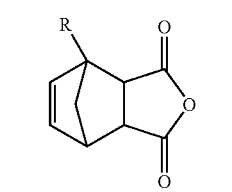

Formula (6)

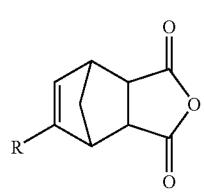

Formula (7)

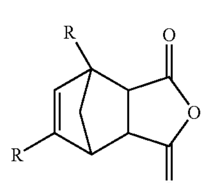

Formula (8)

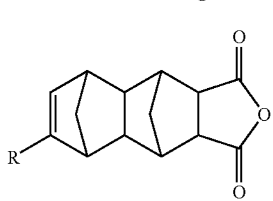

As the above cyclic hydrocarbon monomer, preferred are 5-norbornene-2,3-dicarboxylic anhydride represented by the formula (1) (hereinafter referred to as NAH), and cyclic hydrocarbon monomers of the formulae (2) and (5) to (8), wherein substituent R is a methyl group. Most preferred is NAH.

The cyclic hydrocarbon monomers of the above formulae (1) to (8) are compounds known per se, and they can be easily produced by, for example, a method of heating cyclopentadiene and maleic anhydride in the absence of a catalyst or a method disclosed in JP-A-6-73043. Further, commercially available cyclic hydrocarbon monomers may be employed.

When the above-mentioned cyclic hydrocarbon monomer is employed for the production of the fluorocopolymer of the present invention, the fluorocopolymer containing repeating units (b) can easily be produced without using a special polymerization method which is required in the case where maleic anhydride is employed as disclosed in JP-A-11-193312.

As other monomers, vinyl fluoride, vinylidene fluoride (hereinafter referred to as VdF), trifluoroethylene, hexafluoropropylene (hereinafter referred to HFP), $CF_2{=}CFOR^{f1}$ (wherein $R^{f1}$ is a $C_{1-10}$ perfluoroalkyl group which may contain an oxygen atom between carbon atoms), $CF_2{=}CFOR^{f2}SO_2X^1$ (wherein $R^{f2}$ is a $C_{1-10}$ perfluoroalkylene group which may contain an oxygen atom between carbon atoms, and $X^1$ is a halogen atom or a hydroxyl group), $CF_2{=}CFOR^{f2}CO_2X^2$ (wherein $R^{f2}$ is as defined above, and $X^2$ is a hydrogen atom or a $C_{1-3}$ alkyl group), $CF_2{=}CF(CF_2)_pOCF{=}CF_2$ (wherein p is 1 or 2), $CH_2{=}CX^3(CF_2)_qX^4$ (wherein each of $X^3$ and $X^4$ which are independent of each other, is a hydrogen atom or a fluorine atom, and q is an integer of from 2 to 10), perfluoro(2-methylene-4-methyl-1,3-dioxolane), a $C_{2-4}$ olefin such as ethylene, propylene or isobutene, a vinyl ester such as vinyl acetate, and a vinyl ether such as ethyl vinyl ether or cyclohexyl vinyl ether, may, for example, be mentioned. Such other monomers may be used alone, or two or more of them may be used in combination.

$CF_2{=}CFOR^{f1}$ may, for example, be $CF_2{=}CFOCF_2CF_3$, $CF_2{=}CFOCF_2CF_2CF_3$, $CF_2{=}CFOCF_2CF_2CF_2CF_3$, or $CF_2{=}CFO(CF_2)_8F$. It is preferably $CF_2{=}CFOCF_2CF_2CF_3$.

$CH_2{=}CX^3(CF_2)_qX^4$ may, for example, be $CH_2{=}CH(CF_2)_2F$, $CH_2{=}CH(CF_2)_3F$, $CH_2{=}CH(CF_2)_4F$, $CH_2{=}CF(CF_2)_3H$, or $CH_2{=}CF(CF_{24}H$. It is preferably $CH_2{=}CH(CF_2)_4F$ or $CH_2{=}CH(CF_2)_2F$.

As such other monomer, preferred is at least one member selected from the group consisting of VdF, HFP, $CF_2{=}CFOR^{f1}$, $CH_2{=}CX^3(CF_2)_qX^4$, ethylene, propylene and vinyl acetate, and more preferred is at least one member selected from the group consisting of HFP, $CF_2{=}CFOR^{f1}$, ethylene and $CH_2{=}CX^3(CF_2)_qX^4$. Most preferred is HFP or $CF_2{=}CFOR^{f1}$.

Preferred specific examples for the fluorocopolymer of the present invention include a TFE/$CF_2{=}CFOCF_2CF_2CF_3$/NAH copolymer, a TFE/HFP/NAH copolymer, a TFE/$CF_2{=}CFOCF_2CF_2CF_3$/HFP/NAH copolymer, a TFE/VdF/NHA copolymer, a TFE/$CH_2{=}CH(CF_2)_4F$/NAH/ethylene copolymer, a TFE/$CH_2{=}CH(CF_2)_2F$/NAH/ethylene copolymer, a CTFE/$CH_2{=}CH(CF_2)_4F$/NAH/ethylene copolymer, a CTFE/$CH_2{=}CH(CF_2)_2F$/NAH/ethylene copolymer, and a CTFE/$CH_2{=}CH(CF_2)_2F$/NAH/ethylene copolymer.

The melting point of the fluorocopolymer of the S present invention is preferably from 150 to 320° C., more preferably from 200 to 310° C. When the melting point is within this range, the fluorocopolymer is excellent in the melt co-extrudability with a thermoplastic resin. The melting point is preferably adjusted by suitably selecting the proportion of the repeating units (a), (b) and (c) within the above-mentioned ranges.

The fluorocopolymer of the present invention preferably has, as a polymer terminal group, an adhesive functional group such as an ester group, a carbonate group, a hydroxyl group, a carboxyl group, a carbonyl fluoride group or an acid anhydride residue, whereby it will be excellent in adhesion to a thermoplastic resin or a substrate. Such a polymer terminal group having an adhesive functional group is preferably introduced by suitably selecting the radical polymerization initiator, a chain transfer agent or the like at the time of the preparation of the fluorocopolymer.

The volume flow rate (hereinafter referred to as the value Q) of the fluorocopolymer of the present invention is from 0.1 to 1,000 $mm^3$/sec. The value Q is an index showing the melt fluidity of the fluorocopolymer and will be an indication of the molecular weight. The larger the value Q, the lower the molecular weight, and the smaller the value Q, the higher the molecular weight. The value Q in the present invention is the extrusion rate of the fluorocopolymer when it is extruded through an orifice having a diameter of 2.1 mm and a length of 8 mm under a load of 7 kg at a temperature higher by 50° C. than the melting point of the fluorocopolymer, by using a Flowtester by Shimadzu Corporation. If the value Q is too small, forming by extrusion tends to be difficult, and if it is too large, the mechanical strength of the fluorocopolymer tends to deteriorate. The value Q of the fluorocopolymer of the present invention is preferably from 5 to 500 $mm^3$/sec, more preferably from 10 to 200 $mm^3$/sec.

The method for producing the fluorocopolymer of the present invention is not particularly limited, and a radical polymerization method employing a radical polymerization initiator may be employed. Namely, the fluorocopolymer of the present invention is preferably produced by radical copolymerization of TFE and/or CTFE, the cyclic hydrocarbon monomer and other monomer.

The polymerization method may, for example, be bulk polymerization, solution polymerization employing an organic solvent such as a fluorinated hydrocarbon, a chlorinated hydrocarbon, a fluorinated chlorohydrocarbon, an alcohol or a hydrocarbon, suspension polymerization employing an aqueous medium and, if necessary, a suitable organic solvent, or emulsion polymerization employing an aqueous medium and an emulsifier. Particularly preferred is solution polymerization.

As a method for producing the fluorocopolymer of the present invention, it is preferred to carry out radical copolymerization of TFE and/or CTFE, the cyclic hydrocarbon monomer and other monomer in the presence of an organic solvent and a radical polymerization initiator.

The radical polymerization initiator is preferably a radical polymerization initiator whereby the temperature at which the half-life is 10 hours, is from 0 to 100° C., more preferably from 20 to 90° C. Its specific examples include an azo compound such as azobisisobutyronitrile, a non-fluorine diacyl peroxide such as isobutyryl peroxide, octanoyl peroxide, benzoyl peroxide or lauroyl peroxide, a peroxy dicarbonate such as diisopropylperoxy dicarbonate or di-n-propyl peroxy dicarbonate, a peroxy ester such as tert-butyl peroxy pivalate, tert-butyl peroxy isobutyrate or tert-butyl peroxy acetate, a fluorinated diacyl peroxide such as a compound represented by $(Z(CF_2)_rCOO)_2$ (wherein Z is a hydrogen atom, a fluorine atom or a chlorine atom, and r is an integer of from 1 to 10), and an inorganic peroxide such as potassium persulfate, sodium persulfate or ammonium persulfate.

In the present invention, it is preferred to use a chain transfer agent in order to control the value Q of the fluorocopolymer. The chain transfer agent may, for example, be an alcohol such as methanol or ethanol, a chlorofluorohydrocarbon such as 1,3-dichloro-1,1,2,2,3-pentafluoropropane or 1,1-dichloro-1-fluoroethane, or a hydrocarbon such as pentane, hexane or cyclohexane. As a chain transfer agent for introducing an adhesive functional group to the polymer terminal of the fluorocopolymer, acetic acid, acetic anhydride, methyl acetate, ethylene glycol or propylene glycol may, for example, be mentioned.

In the present invention, the polymerization conditions are not particularly limited. The polymerization temperature is preferably from 0 to 100° C., more preferably from 20 to 90° C. The polymerization pressure is preferably from 0.1 to 10 MPa, more preferably from 0.5 to 3 MPa. The polymerization time is preferably from 1 to 30 hours.

During the polymerization, the concentration of the cyclic hydrocarbon monomer is preferably from 0.01 to 5 mol %, more preferably from 0.1 to 3 mol %, most preferably from 0.1 to 1 mol %, based on all monomers. If the concentration of the cyclic hydrocarbon monomer is too high, the polymerization rate tends to be low. When it is within the above range, the polymerization rate will not decrease during the production, and the fluorocopolymer will be excellent in adhesion. During the polymerization, it is preferred to maintain the concentration of the cyclic hydrocarbon monomer within such a range by continuously or intermittently supplying the cyclic hydrocarbon monomer to the polymerization autoclave in an amount corresponding to the consumed amount, as it is consumed by the polymerization.

The laminate of the present invention comprises a layer of the fluorocopolymer and a layer of a thermoplastic resin other than the fluorocopolymer, which are directly laminated to each other. For the lamination of the fluorocopolymer and the thermoplastic resin, it is preferred to employ a melt-forming method. A co-extrusion method is more preferred, since it is excellent in productivity. The co-extrusion method is a method for obtaining a laminate of at least two layers in the form of films or tubes. Melts coming out from the discharge outlets of two or more extruders will contact in a molten state and formed into a laminate while they pass through a die. For such co-extrusion, the fluorocopolymer and the thermoplastic resin preferably have forming temperatures close to each other. The extrusion temperature is determined depending upon the melting points, the decomposition temperatures, etc. of the fluorocopolymer and the thermoplastic resin. The screw temperature is preferably from 100 to 400° C., and the die temperature is preferably from 150 to 400° C. The rotational speed of the screw is not particularly limited, but it is preferably from 10 to 200 rpm/min. The retention time of the fluorocopolymer in the extruder is preferably from 1 to 20 minutes.

The thermoplastic resin other than the fluorocopolymer, to be used for the co-extrusion with the fluorocopolymer of the present invention, may, for example, be a polyester such as polyethylene terephthalate, polybutylene terephthalate, polyethylene naphthalate or polybutylene naphthalate, a polyamide such as polyamide 6, polyamide 66, polyamide 46, polyamide 11, polyamide 12 or polyamide MXD6 (semi-aromatic polyamide), a polyolefin such as polyethylene or polypropylene, a polyvinyl acetate, a poly(ethylene/vinyl acetate), a polyvinyl alcohol, a poly(ethylene/vinyl alcohol), a polystyrene, a polyvinylidene chloride, a polyacrylonitrile, a polyoxymethylene, a polyphenylene sulfide, a polyphenylene ether, a polycarbonate, a polyamide-imide, a polyether-imide, a polysulfone or a polyallylate.

The coated product of the present invention comprises a substrate having its surface coated with the fluorocopolymer. The substrate may, for example, be an organic material such as a thermoplastic resin other than the above fluorocopolymer, a metal material such as iron, stainless steel, copper, bronze, aluminum, nickel, a magnesium alloy or titanium, or an inorganic material such as glass or ceramics.

As the method for coating the substrate, an electrostatic powder coating method, a rotational molding method, a spray forming method, a fluid dip coating method, a dispersion method or a solvent casting method may, for example, be employed. In the electrostatic powder coating method, it is preferred that a negative high voltage is applied to a powder of the fluorocopolymer to electrify and deposit it on the substrate surface, then the deposited fluorocopolymer is heated and melted at a temperature of at least the melting point and lower than the decomposition point for from 5 minutes to 1 hour to form a coating film of the fluorocopolymer having a predetermined thickness on the substrate surface. In the rotational molding method, it is preferred that a powder of the fluorocopolymer is put into inside of a can-shaped or cylindrical substrate, and while the substrate is rotated, the substrate is heated at a temperature of at least the melting point and lower than the decomposition point of the fluorocopolymer for from 5 minutes to 1 hour to melt the fluorocopolymer thereby to form a coating film of the fluorocopolymer having a uniform thickness on the inner surface of the substrate.

In the spray forming method, it is preferred that a semi-molten fluorocopolymer is sprayed on a preheated substrate by means of a powder spray thereby to form a coating film of the fluorocopolymer on the substrate surface.

In the fluidized dip coating method, it is preferred that a powder of the fluorocopolymer is put into a container having a bottom made of an air-permeable porous plate, the powder is fluidized by supplying a gas through the porous plate, and in this fluidized bed, a substrate heated at a temperature of at least the melting point and lower than the decomposition point of the fluorocopolymer is dipped from 1 minute to 1 hour thereby to form a uniform coating film of the fluorocopolymer on the substrate surface.

In the dispersion method, it is preferred that a fine powder of the fluorocopolymer is suspended in water or a solvent or dispersed in a liquid, such a suspension or dispersion is sprayed on a substrate, followed by evaporating the water or solvent, to form a uniform powder deposition layer, which is then heated and melted at a temperature of at least the melting point and lower than the decomposition point of the fluorocopolymer for from 1 minute to 1 hour thereby to form a coating film of the fluorocopolymer on the substrate surface.

In a case where the fluorocopolymer can be dissolved in a solvent, it is also preferred to apply it on the surface of a substrate by e.g. casting or dipping, to form a coating film of the fluorocopolymer.

It is also preferred that the surface of the substrate is pre-treated in order to improve the adhesion. Such pre-treatment may, for example, be sand blasting treatment, phosphate treatment, hydrochloric acid treatment or sulfuric acid treatment.

Now, the present invention will be described with reference to Examples (Examples 1 to 3, 6 and 7) and Comparative Examples (Example 4 and 5). However, it should be understood that the present invention is by no means thereby restricted. Further, the adhesive strength, the fuel permeation constant and the content of NAH were measured by the following methods.

Adhesive Strength (Unit: N/cm)

A fluorocopolymer film having a thickness of 100 μm, and a polyamide film having a thickness of 100 μm, a copper foil, an aluminum foil or a polyimide film, were put together and melt-bonded by means of a heat sealer (manufactured by Fuji Impulse Co., Ltd.) at a heating level 9 (final temperature: 280° C.). The obtained laminated film was cut into a strip of 10 cm×1 cm to obtain a test specimen. The peel strength of the test specimen was measured by means of a tensile tester and taken as the adhesive strength.

Fuel Permeation Constant (Unit: $g \cdot mm/m^2 \cdot 24$ h)

The fuel permeation constant of the fluorocopolymer was measured in accordance with a cup method prescribed in JIS Z0208. From 9.5 to 10 g of fuel E10 (isooctane:toluene:ethanol=50:50:10 volume ratio) was put into a cup having a permeation area of 28.26 $cm^2$. The top of the cup was covered with a fluorocopolymer film having a thickness of 100 μm obtained by hot pressing and held at 60° C. for 10 days, whereupon from the weight reduction, the fuel permeation constant was obtained. The lower the fuel permeation constant, the better the fuel barrier properties.

Content (Unit: mol %) of Repeating Units Based on NAH

Using a fluorocopolymer film having a thickness of 100 μm, the infrared absorption spectrum was measured. The absorption peak of NAH in the infrared absorption spectrum appears at 1,778 $cm^{-1}$, and the absorbance of that peak was measured. Using the molar absorptivity 1,340 $l \cdot mol^{-1} \cdot cm^{-1}$ of NAH, the content of repeating units based on NAH was calculated.

Content (Unit: mol %) of Repeating Units Based on $CF_2{=}CFO(CF_2)_3F$

In accordance with the method disclosed in Asahi Glass Research Report 40 (1), 75 (1990), melt-NMR analysis was carried out, followed by calculation to obtain the content.

EXAMPLE 1

A polymerization autoclave having an internal capacity of 1.2 L and equipped with a stirrer, was deaerated, and 1,131 g of 1,3-dichloro-1,1,2,2,3-pentafluoropropane (AK225cb, manufactured by Asahi Glass Company, Limited, hereinafter referred to as AK225cb) and 120.1 g of $CF_2{=}CFO(CF_2)_3F$ were charged. Then, inside of the polymerization autoclave was heated to 50° C., and 73 g of TFE was charged to raise the pressure to 0.43 MPa/G. As a polymerization initiator solution, 1 $cm^3$ of an AK225cb solution containing 0.1 mass % of (perfluorobutyryl) peroxide was charged to initiate polymerization, and every 10 minutes thereafter, 1 $cm^3$ of the polymerization initiator solution was charged. Further, TFE was continuously charged in order to maintain the pressure at 0.43 MPa/G during the polymerization. Further, an AK225cb solution containing 0.3 mass % of NAH was continuously charged in an amount corresponding to 0.1 mol % based on the molar amount of TFE charged during the polymerization. After 5 hours from the initiation of the polymerization, when 50 g of TFE was charged, the internal temperature of the polymerization autoclave was lowered to room temperature, and at the same time, purging was carried out to normal pressure.

The obtained slurry of fluorocopolymer 1 was subjected to filtration by a glass filter, the solvent was separated, followed by drying at 150° C. for 15 hours to obtain 45 g of fluorocopolymer 1.

From the results of the melt NMR analysis and infrared absorption spectrum analysis, the copolymerized composition of fluorocopolymer 1 was repeating units based on TFE/repeating units based on $CF_2{=}CFO(CF_2)_3F$/repeating units based on NAH=93.4/6.5/0.1 (mol %). The melting point was 270° C., and the value Q was 0.45 $mm^3$/sec.

The adhesive strength with a film of polyamide 12 (3030JLX2, manufactured by UBE INDUSTRIES, LTD.) was 13.5 N/cm, the adhesive strength with a copper foil was 11.5 N/cm, and the adhesive strength with an aluminum foil was 10.5 N/cm. Thus, it was found to be excellent in adhesion in each case. The fuel permeation constant was 0.65 $g \cdot mm/m^2 \cdot 24$ h.

EXAMPLE 2

The polymerization autoclave used in Example 1, was deaerated, and 500 g of AK225cb, 600 g of HFP and 50 g of TFE were charged, and inside of the polymerization autoclave was heated to 50° C. The pressure became 0.98 MPa/G. As a polymerization initiator solution, 1 $cm^3$ of an AK225cb solution containing 0.25 mass % of di(perfluorobutyryl) peroxide was charged to initiate polymerization, and every 10 minutes thereafter, 1 $cm^3$ of the polymerization initiator solution was charged. Further, TFE was continuously charged in order to maintain the pressure at 0.98 MPa/G during the polymerization. Further, an AK225cb solution containing 0.3 mass % of NAH was continuously charged in an amount corresponding to 0.1 mol % of TFE continuously charged. After 4 hours and 20 minutes from the initiation of polymerization, when 50 g of TFE was charged, the interior of the polymerization autoclave was cooled to room temperature, and at the same time, unreacted monomers were purged.

The obtained slurry of fluorocopolymer 2 was subjected to filtration by a glass filter, the solvent was separated, followed by drying at 150° C. for 15 hours to obtain 55 g of fluorocopolymer 2.

From the results of the melt NMR analysis and infrared absorption spectrum analysis, the copolymerized composition of fluorocopolymer 2 was repeating units based on TFE/repeating units based on HFP/repeating units based on NAH=92.6/7.3/0.1 (mol %). The melting point was 270° C., and the value Q was 2.1 $mm^3$/sec.

The adhesive strength with a film of polyamide 12 (3030JLX2) was 7.9 N/cm, the adhesive strength with a copper foil was 6.5 N/cm, the adhesive strength with an aluminum foil was 8.4 N/cm, and the adhesive strength with a polyimide (UPILEX, manufactured by UBE INDUSTRIES, LTD.) was 6.8 N/cm. Thus, it was found to be excellent in adhesion in each case. The fuel permeation constant was 0.48 $g \cdot mm/m^2 \cdot 24$ h.

EXAMPLE 3

The polymerization autoclave used in Example 1, was deaerated, and 500 g of AK225cb, 600 g of HFP, 25 g of $CF_2{=}CFO(CF_2)_3F$ and 50 g of TFE were charged, and inside of the polymerization autoclave was heated to 50° C. The pressure became 0.96 MPa/G. As a polymerization initiator solution, 1 $cm^3$ of an AK225cb solution containing 0.25 mass % of di(perfluorobutyryl) peroxide was charged to initiate polymerization, and every 10 minutes thereafter, 1 $cm^3$ of the polymerization initiator solution was charged. TFE was continuously charged in order to maintain the pressure at 0.96 MPa/G during the polymerization. Further, an AK225cb solution containing 0.3 mass % of NAH was continuously charged in an amount corresponding to 0.1 mol % of TFE continuously charged. After 4 hours and 40 minutes from the initiation of polymerization, when 50 g of TFE was charged, the interior of the polymerization autoclave was cooled to room temperature, and at the same time, unreacted monomers were purged.

The obtained slurry of fluorocopolymer 3 was subjected to filtration by a glass filter, the solvent was separated, followed by drying at 150° C. for 15 hours to obtain 55 g of fluorocopolymer 3.

From the results of the melt NMR analysis and infrared absorption spectrum analysis, the copolymerized composition of fluorocopolymer 3 was repeating units based on TFE/repeating units based on hexafluoropropene/repeating units based on $CF_2{=}CFO(CF_2)_3F$/repeating units based on NAH=91.4/7.0/1.5/0.1 (mol %). The melting point was 257° C., and the value Q was 3.2 $mm^3$/sec.

The adhesive strength with a film of polyamide 12 (3030JLX2) was 15.2 N/cm, the adhesive strength with a copper foil was 13.2 N/cm, the adhesive strength with an aluminum foil was 11.2 N/cm, and the adhesive strength with a polyimide (UPILEX, manufactured by UBE INDUSTRIES, LTD.) was 9.4 N/cm. Thus, it was found to be excellent in adhesion in each case. The fuel permeation constant was 0.33 g·mm/$m^2$·24 h.

EXAMPLE 4 (COMPARATIVE EXAMPLE)

Fluorocopolymer 4 was obtained in the same manner as in Example 1 except that it contained no NAH. From the results of the melt NMR analysis, the copolymerized composition of fluorocopolymer 4 was repeating units based on TFE/repeating units based on $CF_2{=}CFO(CF_2)_3F$=95.5/4.5 (mol %). The melting point was 285° C., and the value Q was 0.25 $mm^3$/sec. The film of fluorocopolymer 4 did not bond to any one of the film of polyamide 12, the copper foil and the aluminum foil. The fuel permeation constant was 0.40 g·mm/$m^2$·24 h.

EXAMPLE 5 (COMPARATIVE EXAMPLE)

40 g of fluorocopolymer 5 was obtained by polymerization in the same manner as in Example 1 except that itaconic anhydride was used instead of NAH. From the results of the melt NMR analysis and infrared absorption spectrum analysis, the copolymerized composition of the fluorocopolymer 5 was repeating units based on TFE/repeating units based on $CF_2{=}CFO(CF_2)_3F$/repeating units based on itaconic anhydride=93.7/6.2/0.1 (mol %). The melting point was 275° C., and the value Q was 1.58 $mm^3$/sec. A sheet obtained by press-forming fluorocopolymer 5 at 340° C., was non-uniform, and transparent and non-transparent portions were present.

EXAMPLE 6

The polymerization autoclave used in Example 1 was deaerated, and 889 g of 1-hydrotridecafluorohexane, 328.8 g of AK225cb, 7.3 g of $CH_2{=}CH(CF_2)_2F$, 165 g of TFE and 4.4 g of ethylene were charged. Then, inside of the polymerization autoclave was heated to 66° C. The pressure in the polymerization autoclave was 1.448 MPa/G. As a polymerization initiator solution, 9.6 $cm^3$ of a 225cb solution containing 2 mass % of tert-butyl peroxy pivalate was charged to initiate polymerization. A gas mixture comprising TFE and ethylene in a molar ratio of 60/40 was continuously charged in order to maintain the pressure at 1.448 MPa/G during the polymerization. Further, $CH_2{=}CH(CF_2)_2F$ in an amount corresponding to 3.3 mol % and an AK225cb solution containing 0.8 mass % of NAH corresponding to 0.5 mol %, based on the total molar amount of the gas mixture of TFE and ethylene charged during the polymerization, were continuously charged. After 3.4 hours from the initiation of polymerization, when 100 g of the gas mixture of TFE and ethylene was charged, the internal temperature of the polymerization autoclave was lowered to room temperature, and at the same time, purging was carried out to normal pressure.

The obtained slurry of fluorocopolymer 6 was subjected to filtration by a glass filter, the solvent was separated, followed by drying at 150° C. for 15 hours to obtain 105 g of fluorocopolymer 6.

From the results of the melt NMR analysis and fluorine content analysis, the copolymerized composition of fluorocopolymer 6 was repeating units based on TFE/repeating units based on ethylene/repeating units based on $CH_2{=}CH(CF_2)_2F$/repeating units based on NAH=58.0/38.6/3.1/0.3 (mol %). The melting point was 237° C., and the value Q at 297° C. was 45 $mm^3$/sec.

The adhesive strength with a film of polyamide 12 (3030JLX2, manufactured UBE INDUSTRIES, LTD.) was 12.0 N/cm, the adhesive strength with a copper foil was 9.5 N/cm, the adhesive strength with an aluminum foil was 8.7 N/cm, and adhesive strength with a polyimide (UPILEX, manufactured by UBE INDUSTRIES, LTD.) was 7.5 N/cm. Thus, it was found to be excellent in adhesive in each case.

EXAMPLE 7

The polymerization autoclave used in Example 1, was deaerated, and 602 g of 1-hydrotridecafluorohexane, 201 g of AK225cb, 377 g of HFP, 3.2 g of $CH_2{=}CH(CF_2)_4F$, 105 g of TFE and 3.3 g of ethylene were charged. Then, inside of the polymerization autoclave was heated to 66° C. The pressure in the polymerization autoclave was 1.475 MPa/G. As a polymerization initiator solution, 5.8 $cm^3$ of 225cb solution containing 5 mass % of tert-butyl peroxy pivalate was charged to initiate polymerization. A gas mixture comprising TFE and ethylene in a molar ratio of 54/46 was continuously charged in order to maintain the pressure at 1.475 MPa/G during the polymerization. Further, $CH_2{=}CH(CF_2)_4F$ in an amount corresponding to 1.0 mol % and an AK225cb solution containing 0.9 mass % of NAH corresponding to 0.2 mol %, based on the total molar amount of the gas mixture of TFE and ethylene charged during the polymerization, were continuously charged. After 5.2 hours from the initiation of polymerization, when 70 g of the gas mixture of TFE and ethylene was charged, the internal temperature of the polymerization autoclave was lowered to room temperature, and purging was carried out to normal pressure.

The obtained slurry of fluorocopolymer 7 was subjected to filtration by a glass filter, the solvent was separated, followed by drying at 120° C. for 15 hours to obtain 79 g of fluorocopolymer 7.

From the results of the melt NMR analysis and fluorine content analysis, the copolymerized composition of fluorocopolymer 7 was repeating units based on TFE/repeating units based on ethylene/repeating units based on HFP/repeating units based on $CH_2{=}CH(CF_2)_4F$/repeating units based on NAH=46.7/43.3/8.9/1.0/0.1 (mol %). The melting point was 175° C., and the value Q at 220° C. was 21 $mm^3$/sec.

The adhesive strength with a film of polyamide 12 (3030JLX2, manufactured by UBE INDUSTRIES, LTD.) was 9.6 N/cm. Thus, it was found to be excellent in adhesion.

The fluorocopolymer and the laminate of the present invention is excellent in e.g. heat resistance, chemical resistance, corrosion resistance, oil resistance and weather resistance, and thus are suitable for application to e.g. fuel hoses for automobiles, fuel tanks for automobiles, industrial hoses, hoses for food products, weather resistant laminated films, weather resistant laminated sheets, chemical resistant linings, weather resistant linings, IC substrates, and adhesive materials.

Further, the coated product of the present invention is excellent in e.g. heat resistance, chemical resistance, corrosion resistance, oil resistance, weather resistance, abrasion resistance and lubricating properties, and thus is suitable for application to e.g. reactors, containers, pipings, etc., for food products, for medical applications, for semiconductors or for chemical plants, tank lorries for transportation of chemical solutions, shatterproof glass plates, shatterproof glass bottles and abrasion resistant ceramic components.

The entire disclosures of Japanese Patent Application No. 2004-314179 filed on Oct. 28, 2004 and Japanese Patent Application No. 2005-121575 filed on Apr. 19, 2005 including specifications, claims and summaries are incorporated herein by reference in their entireties.

What is claimed is:

1. A fluorocopolymer which comprises:

repeating units (a) based on tetrafluoroethylene and/or chlorotrifluoroethylene;

repeating units (b) based on a cyclic hydrocarbon monomer, having a dicarboxylic anhydride group and an endocyclic polymerizable unsaturated group, selected from the group consisting of the following formulae (1) to (8):

Formula (1)

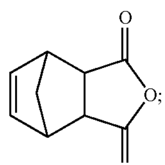

Formula (2)

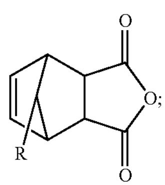

Formula (3)

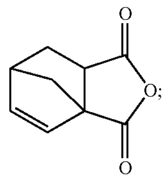

Formula (4)

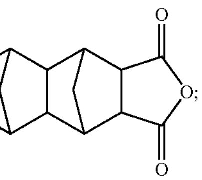

Formula (5)

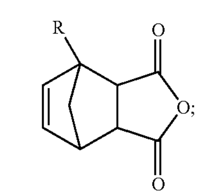

-continued

Formula (6)

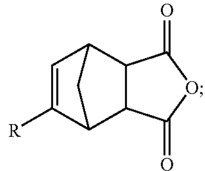

Formula (7)

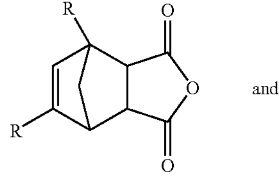

and

Formula (8)

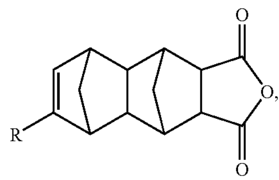

wherein in the formulae (2) and (5) to (8), R is a $C_{1-6}$ lower alkyl group, a halogen atom selected from a fluorine atom, a chlorine atom, a bromine atom and an iodine atom, or a halogenated alkyl group having hydrogen atoms in the above lower alkyl group substituted by halogen atoms; and repeating units (c) based on other monomer (excluding tetrafluoroethylene, chlorotrifluoroethylene and the cyclic hydrocarbon monomer);

wherein the repeating units (a) are from 50 to 99.89 mol %, the repeating units (b) are from 0.01 to 5 mol %, and the repeating units (c) are from 0.1 to 49.99 mol %, based on the total molar amount of the repeating units (a), (b) and (c); and which has a volume flow rate of from 0.1 to 1,000 $mm^3$/sec.

2. The fluorocopolymer according to claim 1, wherein the cyclic hydrocarbon monomer is 5-norbomene-2,3-dicarboxylic anhydride.

3. The fluorocopolymer according to claim 1, wherein said other monomer is at least one member selected from the group consisting of vinylidene fluoride, hexafluoropropylene, $CF_2{=}CFOR^{f1}$ (wherein $R^{f1}$ is a $C_{1-10}$ perfluoroalkyl group which may contain an oxygen atom between carbon-carbon atoms), $CH_2{=}CX^3(CF_2)_qX^4$ (wherein each of $X^3$ and $X^4$ which are independent of each other, is a hydrogen atom or a fluorine atom, and q is an integer of from 2 to 10), ethylene, propylene and vinyl acetate.

4. The fluorocopolymer according to claim 1, wherein said other monomer is at least one member selected from the group consisting of hexafluoropropylene, $CF_2{=}CFOR^{f1}$ (wherein $R^{f1}$ is a $C_{1-10}$ perfluoroalkyl group which may contain an oxygen atom between carbon-carbon atoms), ethylene and $CH_2{=}CX^3(CF_2)_qX^4$ (wherein each of $X^3$ and $X^4$ which are independent of each other, is a hydrogen atom or a fluorine atom, and q is an integer of from 2 to 10).

5. The fluorocopolymer according to claim 1, wherein said other monomer is hexafluoropropylene or $CF_2$=CFOR$^{f1}$ (wherein R$^{f1}$ is a $C_{1-10}$ perfluoroalkyl group which may contain an oxygen atom between carbon-carbon atoms).

6. The fluorocopolymer according to claim 1, which has a melting point of from 150 to 320° C.

7. A method for producing the fluorocopolymer as defined in claim 1, which comprises radical copolymerization of tetrafluoroethylene and/or chlorotrifluoroethylene, a cyclic hydrocarbon monomer having a dicarboxylic anhydride group and an endocyclic polymerizable unsaturated group, and other monomer (excluding tetrafluoroethylene, chlorotrifluoroethylene and the cyclic hydrocarbon monomer) in the presence of an organic solvent and a radical polymerization initiator.

8. A laminate comprising a layer of the fluorocopolymer as defined in claim 1 and a layer of a thermoplastic resin other than the fluorocopolymer, directly laminated to each other.

9. The laminate according to claim 8, wherein the thermoplastic resin is at least one member selected from the group consisting of a polyester, a polyvinyl acetate, a poly(ethylene/vinyl acetate), a polyvinyl alcohol, a poly (ethylene/vinyl alcohol), a polystyrene, a polyvinylidene chloride, a polyacrylonitrile, a polyoxymethylene, a polyphenylene sulfide, a polyphenylene ether, a polycarbonate, a polyamide-imide, a polyether-imide, a polysulfone, and a polyallylate.

10. A coated product comprising a substrate having its surface coated with the fluorocopolymer as defined in claim 1.

11. The laminate according to claim 9, wherein the polyester is selected from the group consisting of polyethylene terephthalate, polybutylene terephthalate, polyethylene naphthalate, and polybutylene naphthalate.

12. The laminate according to claim 9, wherein the polyamide is selected from the group consisting of poly(ϵ-caprolactum), poly(hexamethylene adipamide), poly(tetramethylene adipamide), poly(11-undecanlactam), poly(ω-laurolactam), and poly(m-xylylene adipamide).

13. The laminate according to claim 9, wherein the polyolefin is selected from the group consisting of polyethylene and polypropylene.

14. The laminate according to claim 1, wherein R is a methyl group.

15. The laminate according to claim 1, wherein said repeating units (b) are from 0.1 to 3 mol %.

16. The laminate according to claim 1, wherein said repeating units (b) are from 0.1 to 1 mol %.

17. The laminate according to claim 1, wherein said melting point of the fluorocopolymer is from 200 to 310° C.

18. The laminate according to claim 1, wherein said volume flow rate is from 5 to 500 mm$^3$/sec.

19. The laminate according to claim 1, wherein said volume flow rate is from 10 to 200 mm$^3$/sec.

20. The coated product according to claim 10, wherein said substrate comprises an organic material, a metal material, or an inorganic material.

* * * * *